Nov. 20, 1951 W. J. CRUMP 2,575,615
RETRACTABLE STEP
Filed March 20, 1948 2 SHEETS—SHEET 1
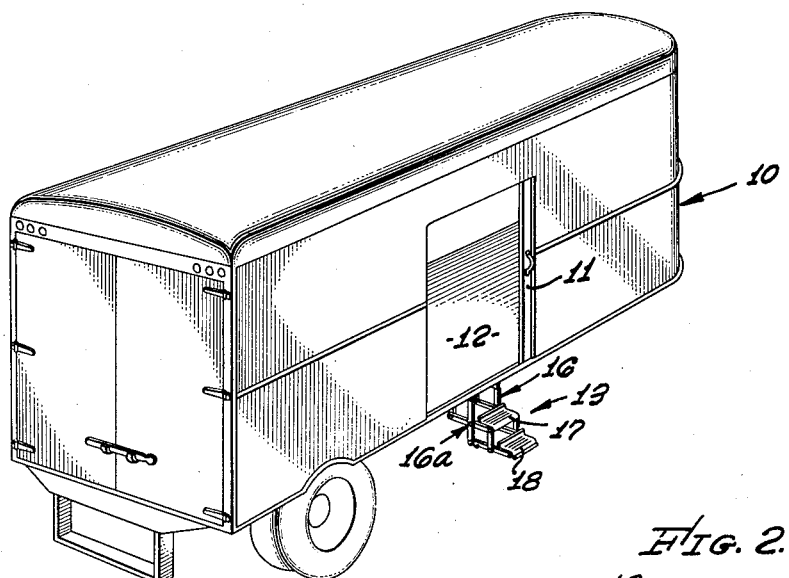
FIG. 1.
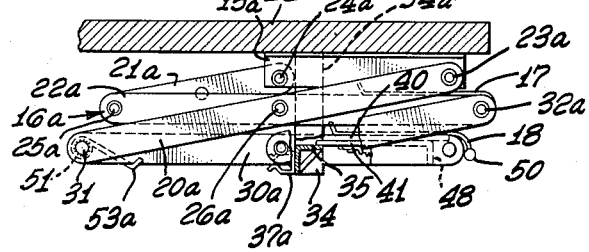
FIG. 2.
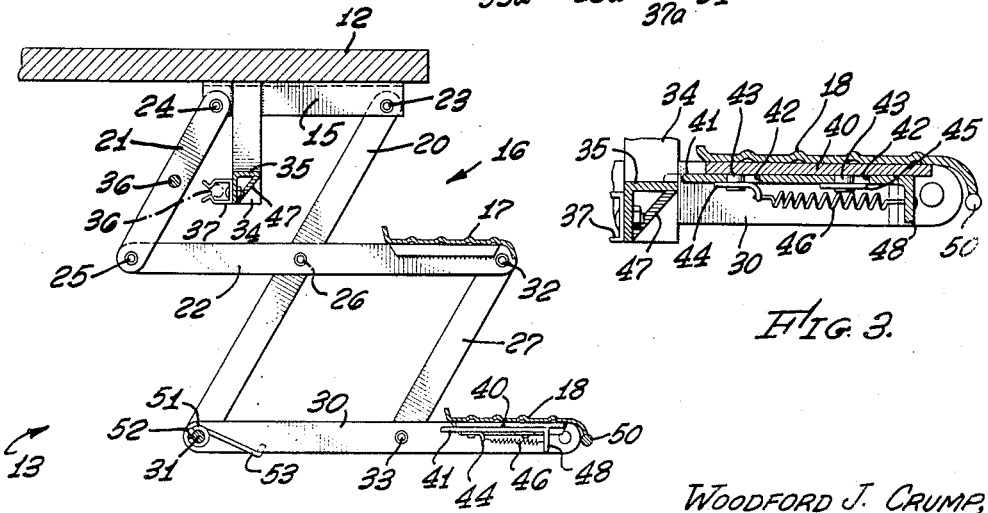
FIG. 3.
FIG. 4.
WOODFORD J. CRUMP,
INVENTOR.
BY
Robert W. Fulwider
ATTORNEY.

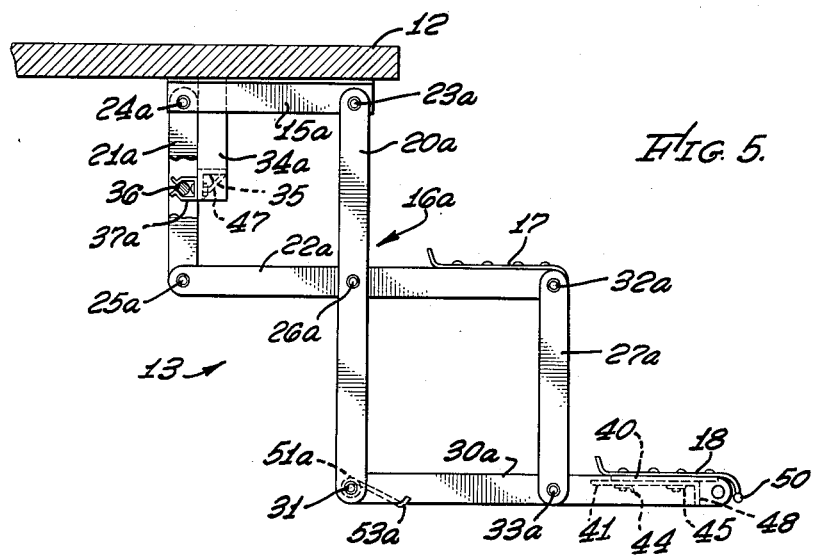
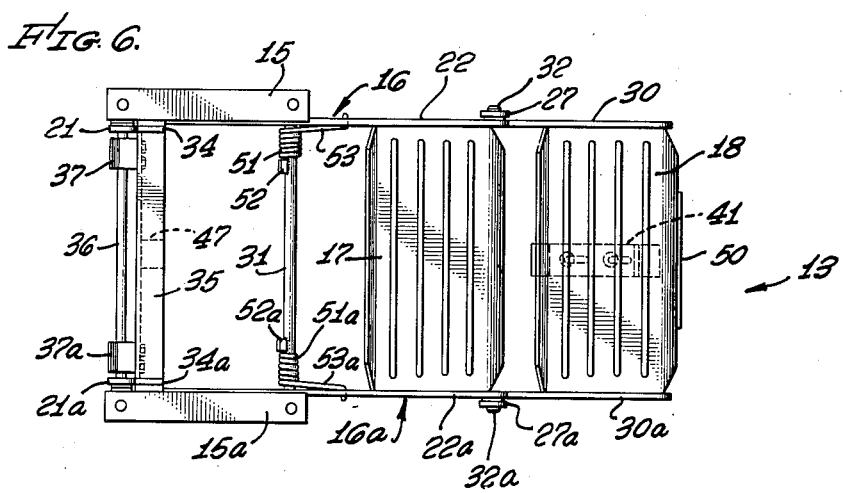
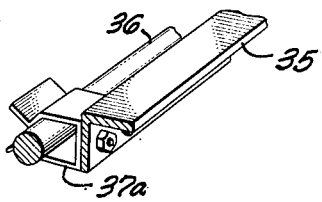

Patented Nov. 20, 1951

2,575,615

UNITED STATES PATENT OFFICE 2,575,615

RETRACTABLE STEP

Woodford J. Crump, Los Angeles, Calif., assignor to Truk-Step Company, Inc., Los Angeles, Calif., a corporation of California Application March 20, 1948, Serial No. 16,134

7 Claims. (Cl. 228—19.2)

1

My invention relates generally to retractable steps and more particularly to steps of this type intended for use on freight vehicles.

As the use of trucks and trailers for the hauling of freight has increased, it has become more apparent that safer and more convenient means of affording access to the interior of the vehicle must be provided. In some cases, loading docks or platforms are available which permit the rapid loading and unloading of such a vehicle, with the floor of the dock or platform being at the same elevation as that of the vehicle. However, only a relatively few establishments have such facilities, and in general the operator or other person handling the freight must climb to the floor of the vehicle by the most convenient means available. In addition to being unpleasant and time-consuming, this is also dangerous in view of the increased possibility of falling when carrying packages. Various expedients have been tried, but the most satisfactory results have been obtained with retractable steps mounted beneath the floor of the vehicle.

It is therefore a major object of my invention to provide an improved retractable step.

Another object of my invention is to provide a step of this type capable of safely and firmly supporting a considerable weight without danger of collapsing.

It is a further object of my invention to provide a step of this type which may be quickly and easily operated by the driver or operator of the vehicle with a minimum of time and effort.

Still another object of my invention is to provide a retractable step having improved locking means which will firmly and securely hold the step in either extended or retracted position.

It is a still further object of my invention to provide a step of this type which so cooperates with the holding mechanism as to render the operation of the device practically automatic.

These and other objects and advantages of my invention will become apparent from the following description of a preferred form thereof, and from the drawings illustrating that form in which:

Fig. 1 is a perspective view of a vehicle, here shown as a trailer or semi-trailer, on which my improved step is installed;

Fig. 2 is a side elevational view of my improved step in its folded or retracted position;

Fig. 3 is a sectional view, similar to Fig. 2 but to an enlarged scale, of the locking means used to hold the step in retracted position;

Fig. 4 is a side elevational view, partially in

2 section, of the step intermediate its retracted and extended positions;

Fig. 5 is a side elevational view partially broken away, showing the step in its fully extended position, with the operation of the locking means clearly shown;

Fig. 6 is a top plan view of my improved step in its extended position;

Fig. 7 is a perspective view of the latch bar of the locking mechanism shown in Fig. 3; and Fig. 8 is a perspective view of the down lock used to hold the step in extended position.

Referring now to the drawings and particularly to Fig. 1 thereof, the numeral 10 indicates generally a vehicle such as a trailer having an access door 11 therein through which freight may be moved. For convenience in loading and unloading, the floor 12 of the vehicle 10 is generally at substantially the same height as the conventional loading platforms used in many freight establishments, and consequently is several feet above the ground. Some form of step must be available where there is no loading platform, and this preferably takes the form of my improved retractable step 13 mounted beneath the floor 12. Essentially, the step consists of a pair of supporting brackets or members 15 and 15a, carrying a pair of parallelogram linkages 16 and 16a between which a pair of step treads 17 and 18 extend.

As indicated in Figs. 2, 4 and 5, one of the most convenient methods of attaching my improved step is to bolt or otherwise securely fasten the supporting brackets 15 and 15a to the underside of the floor 12. It will be seen that each of these supporting brackets or angles extends in a direction substantially perpendicular to the adjacent edge of the floor 12, and for convenience in description, the corresponding directions will hereinafter be referred to as forward and rearward, respectively, as the portions nearer to and farther from the edge of the floor are referred to. The parallelogram linkages 16 and 16a are pivotally attached to the supporting angles 15 and 15a, respectively, in a manner shown in Fig. 4 and now to be described.

At the forward end of the supporting angle 15, I pivotally attach a bar 20 adapted to extend downwardly, and/or rearwardly as the step is moved from extended to retracted position. At the rear end of the supporting angle 15 I pivotally attach a bar 21 approximately half the length of the bar 20, and as will hereinafter be seen, the bars 20 and 21 form the opposite sides of a parallelogram. To prevent any possibility of binding or interference between the bars 20 and 21, the longer bar 20 is abutted against the outer face of the vertically extending portion of the supporting angle 15, while the bar 21 is abutted against the inner face. At the lower end of the bar 21, I pivotally attach a horizontally extending bar 22 having a length approximately equal to that of the bar 20, pivotally connecting the latter and the horizontally extending bar 22 near their midpoints.

While other methods of pivotal attachment may be used, I have found it very convenient to use rivets to make all of these points of pivotal attachment. Thus, a rivet 23 attaches the bar 20 to the angle support 15, a rivet 24 connects the bar 21 to the angle, a rivet 25 connects the bar 21 to the horizontally extending bar 22, while a rivet 26 connects the bars 20 and 22. The distance between the rivets 23 and 24 is made equal to the distance between the rivets 25 and 26, while the distance between rivets 23 and 26 is equal to that between the rivets 24 and 25. In this manner, a parallelogram is formed in which the supporting angle 15 and the rear end of the horizontal bar 22 form opposite sides of the parallelogram, while the bar 21 and the upper portion of the bar 20 form the other opposite sides.

By placing the horizontally extending bar 22 on the inner surface of the bar 20 and on the outer surface of the bar 21, the bar 22 will be substantially co-planar with the supporting angle 15, thereby materially reducing the possibility of binding and difficult operation.

At the forward end of the horizontally extending bar 22, I pivotally attach a bar 27 adapted to extend generally downwardly and rearwardly, and at the lower ends of the bars 20 and 27, I pivotally attach a lower or second horizontally extending bar 30. The bar 30 is substantially the same length as the horizontally extending bar 22, and the vertical bar 20 is connected to the rear end of the lower horizontal bar by means of a rod 31 extending between the linkages 16 and 16a. The bar 27 is pivotally attached to the horizontally extending bars 22 and 30 by suitable means such as rivets 32 and 33 respectively, and the distance between the rivets 26 and 32 on the bar 22 is equal to the distance between the rod 31 and rivet 33 of the bar 30. The distance between the rivet 26 and rod 31 of the bar 20 is equal to the distance between the rivets 32 and 33 of the bar 27, thereby forming a second parallelogram which is operated in synchronism with the first parallelogram previously described.

The parallelogram linkage 16 which has just been described is substantially duplicated by the linkage 16a with the exception that the generally vertically and rearwardly extending bars 20a, 21a, and 27a are located on opposite sides of the horizontally extending bars 22a and 30a so that the two linkages are symmetrical about a vertical plane midway between them.

Extending between the bars 22 and 22a at their forward ends is the step tread 17 which is firmly attached to the bars as by welding. A similar step tread 18 is attached between the forward ends of the horizontally extending bars 30 and 30a, the treads 17 and 18 preferably being attached to the inner surfaces of their corresponding horizontally extending bars. These treads are preferably identical, and may be any of several metal treads of this type which are now generally available on the market. Such treads are of fairly heavy gauge metal, and are suitably roughened or corrugated to provide a non-skid surface or footing, while providing sufficient strength to act as transverse braces for the linkages 16 and 16a.

The mechanism which has been described will thus be seen to consist essentially of a pair of lazy tong linkages having one set of links, the elements 15, 22 and 30, which remain horizontal at all times while the other links, elements 20, 21, and 27, may be moved from a generally horizontal position to a vertical position, thereby extending the linkage and lowering the horizontal elements. The retracted or raised position of the device is shown in Fig. 2, while its extended or lower position is shown in Fig. 5. Without other means, the device would normally tend to assume the extended position, the force of gravity urging the various elements to their lowermost positions. However, any inwardly directed force applied to the linkage will tend to retract the step, thereby giving an insecure and dangerous footing. In addition, it is generally desirable if not essential that the step be capable of being held in its folded or retracted position when not in use. This requires that locking or holding means be provided to hold the step in either of its two limiting positions, and, of course, these holding means should be readily releasable for the convenient operation of the step. To secure all of these results, I have developed the holding means about to be described.

Immediately forward of the rearmost links 21 and 21a, and on the same side of the supporting angles 15 and 15a, I attach downwardly extending arms 34 and 34a. At their lower ends, the arms 34 and 34a are joined together by a transversely extending angle member 35 so oriented with respect to the remainder of the device that one leg of the angle extends forwardly from the upper end of the downwardly extending leg at the rear of the bars 34 and 34a. It will be appreciated that this combination of downwardly extending arms and transverse angle member acts to strengthen and brace the entire step assembly, and when the step is in its extended position, the shorter vertically extending bars 21 and 21a will bear against the rear edge of the arms 34 to provide a positive stop which prevents any further rotation of the assembly in an outward direction.

To hold the linkages 16 and 16a against unintentional rearward movement, I place a transversely extending rod 36 between the bars 21 and 21a and mount a pair of clips 37 and 37a on the rear surface of the angle member 35, adapted to engage the rod 36. The operation and mounting of the clips 37 and 37a is clearly shown in Fig. 8, where it will be seen that each of the clips consists essentially of a resilient U-shaped member having the ends of the parallel arms shaped to receive the rod 36 and force the arms apart as the rod is moved toward or away from the base of the clips. By providing the arms of the clips 37 and 37a with the proper stiffness, a considerable amount of force must be applied to the rod 36 to cause it to enter or be removed from the clips. The angles formed by the divergent and convergent portions of the arms of the clips 37 and 37a with respect to the bearing surface of the rod 36 will also determine the amount of force necessary to separate the arms, and it is thus possible to have the clips designed to receive the rod with relatively little force, and securely hold it against any but a sharp and sudden blow such as might be delivered by a kick. Preferably, the size and positioning of the clips 37 and 37a is so correlated with the position of the arm 34 and bar 21 that the bar is firmly held against the arm when the clips receive the rod. In this manner, I provide a very firm and sturdy holding means or down lock adapted to retain the step in extended position, but releasable by a sudden blow such as a kick delivered against the lower step 18, to permit the step to be retracted.

To hold the step in its raised or retracted position, I provided a spring urged latch member mounted beneath the lower step 18, adapted to engage the upper surface of the angle member 35 when the step is raised. As seen best in Fig. 3, a supporting plate 40 is centrally mounted on the undersurface of the lower step tread 18. Slidably mounted on the supporting plate 40 for forward and rearward movement with respect thereto is a latch bar 41 preferably having slots 42 therein through which rivets 43 may extend to hold the latch bar to the supporting plate. Preferably, washers 44 and 45 are placed between the heads of the rivets 43 and the latch bar 41, with one edge of the rearmost washer 44 being bent to receive a helical spring 46 extending from the washer to a vertically extending hand grip 48 at the forward end of the latch bar, thereby urging the latter rearwardly to the position shown in phantom outline in Fig. 3.

The length of the latch bar 41 is so designed that when the step 13 is in its retracted position, the rear end of the latch bar will rest upon the upper surface of the transversely extending angle member 35, thereby locking the step in this position. To release the step, it is only necessary to reach beneath the lower tread 18 and grasp the hand grip 48 of the latch bar 41, pulling it forwardly against the urging of the spring 46 until the bar is clear of the angle member 35, whereupon the linkages 16 and 16a may rotate downwardly to extend the step.

To insure that the latch bar 41 will engage the angle member 35 when the step is moved to retracted position, an angularly positioned guide or plate 47 is attached to the lower surface of the angle member in such a manner that the plate acts as a cam to force the latch bar forwardly to clear the forward edge of the angle member. In this manner, as the step assembly 13 is moved upwardly, the latch bar 41 strikes the plate 47 and is forced forwardly with respect to the supporting plate 40, until such time as the lower surface of the latch bar is above the upper surface of the angle 35, whereupon the latch bar moves rearwardly to rest upon the upper surface and retain the step in its retracted position.

It is to be expected that the step will be moved to its retracted position by a well-aimed kick or blow directed against the forward edge of the lower step tread 18. While this step tread, as previously mentioned, is well and solidly constructed, repeated blows of this type will probably bend and damage it. Consequently, I have found it advisable to weld or otherwise securely attach a reinforcing rod 50 to the forward edge of the step tread 18, this rod extending transversely between the two linkages 16 and 16a and acting to brace and stiffen them while also rendering the tread more rugged. While the same result may be secured by other reinforcing means, I have found that the use of the rod 50 provides the desired strength in a very simple and inexpensive manner.

It will be appreciated that when the step assembly 13 is given a sharp blow to return it to retracted position, a larger proportion of the energy will be used in disengaging the rod 36 from the spring clips 37. The remaining energy will be expanded in raising the step assembly and swinging it rearwardly to retracted position, but a light blow will not provide sufficient energy to perform this task. Consequently, I have found that much better results are obtained if some form of spring or resilient means is employed to assist the retraction of the step. I have therefore mounted a pair of helical springs 51 and 51a upon the transverse rod 31 connecting the bars 20 and 30. The springs 51 and 51a are wrapped around the rod 31, with the inner, adjacent ends 52 and 52a of the springs welded or otherwise securely held to the rod for movement therewith. The opposite or outer ends 53 and 53a of the springs 51 and 51a respectively extend forwardly and outwardly to engage the lower edges of the bars 30 and 30a respectively, while the ends of the rod 31 are welded or otherwise securely held to the vertically extending bars 20 and 20a. The wrap of the springs 51 and 51a is such that they urge the bars 20 and 20a to rotate in a clockwise direction as viewed in Figs. 2, 4 and 5, thereby tending to retract the step assembly 13.

The springs are so designed that when the step is in its retracted position, they exert substantially no force upon the linkages, and thus the step is free to move downwardly under the force of gravity when the latch bar 41 is released. However, as the downward movement continues, the springs 51 and 51a exert a continuously increasing force until the maximum is reached when the step is in its fully extended position. The weight of the step assembly and the momentum it gains during the first portion of its movement are sufficient to insure that the rod 36 will enter the spring clips 37, but it will be apparent that if the arms 21 and 21a hit the arms 34 and 34a too violently, the natural resilience of the parts will cause the rearward movement and immediate disengagement of the rod from the clips. The use of the springs 51 and 51a acts to reduce the speed of downward movement of the step assembly 13, and in this manner insures that the down lock, including the rod 36 and spring clips 37 and 37a, will operate satisfactorily.

Furthermore, the resilient urging of the springs 51 and 51a assists in moving the step assembly 13 upwardly to retracted position when the down lock is released, so that a lighter blow will insure the step assembly's being moved to its upper limiting position where the latch bar 41 will lock the step in its retracted position. It will thus be seen that the springs 51 and 51a improve the operation of the step in both its extension and retraction, providing a device of superior characteristics.

It is believed that the uses and method of operation of my improved retractable step will be apparent from the description which has been given above. One of the features of my improved design is that by providing the releasable holding means to retain the step in its extended position, damage to the step is reduced to a minimum. For example, if the step is inadvertently left in extended position and then struck against a loading platform or other obstruction, the step is merely swung to retracted position without damaging any of the members or elements of the step assembly. It will likewise be noted that in its retracted position, my improved step requires a minimum of vertical space, thereby providing ample road or other clearance so necessary in the operation of vehicles of this general type.

It will be apparent that modifications may be made in the particular design of a retractable step, such as the use of other or heavier linkage members, step treads, supports, etc. However, such changes are believed to be obvious to those skilled in the art and within the scope of the claims attached hereto. Consequently, I do not wish to be restricted to the particular form or arrangement of parts herein described and shown, except as covered by my claims.

I claim:

1. A retractable step which includes: a pair of pivoted linkages each of the lazy tongs type; supporting means pivotally attached to each of said linkages to hold the latter in spaced parallel relationship, whereby a framework capable of extension and retraction is formed; a pair of step treads each extending between said linkages and attached thereto for movement therewith; a transverse member extending between said supporting means and rigid therewith; a second transverse member extending between said linkages and movable therewith; a resilient clip mounted on one of said transverse members and operable to hold the other transverse member firmly thereto, said clip engaging said other member automatically upon said transverse members being moved together, and being manually releasable, whereby said framework may be firmly held in extended position or released therefrom; and latching means operable to extend between said first transverse member and said framework when the latter is in retracted position for retaining said framework in said position, said latching means operating automatically when said framework is moved to retracted position, and being manually releasable to free said framework for movement to extended position.

2. A step as defined in claim 1 having resilient means urging said framework toward retracted position, against normal gravitational force, when said framework is in extended position.

3. A retractable step which includes: a pair of pivoted linkages each of the lazy tongs type; supporting means pivotally attached to each of said linkages to hold the latter in spaced vertically parallel relationship with alternate links of said linkages substantially horizontal; a step tread attached to and extending between corresponding horizontal links of said linkages for movement therewith, whereby a framework capable of extension and retraction is formed, said framework being urged toward extended position by the force of gravity; a transverse member rigidly connected to said supporting means and located downwardly therefrom, said transverse member acting as a stop to limit the movement of said framework in extension; a transverse rod extending between corresponding non-horizontal links of said framework, located to extend parallel and adjacent to said transverse member when said framework is in extended position; resilient clip means connected to said transverse member, located to engage and securely hold said transverse rod when said framework is in extended position; and latching means connected to said framework, adapted to engage with said transverse member when said framework is in retracted position to retain said framework in said position against the urging of gravity.

4. A step as defined in claim 3 having resilient means urging said framework toward retracted position, against normal gravitational force, when said framework is in extended position.

5. A retractable step which includes: a pair of linkages each comprising an upper and a lower horizontal link, a forward link connecting said lower and upper horizontal links, a central link connecting said lower and upper horizontal links and extending above the latter, and rear link connected to said upper horizontal link; a pair of supporting brackets, each connected to the upper ends of said central and rear links to form a pair of lazy tong parallelogram linkages which may be moved from extended to retracted position; a lower step tread attached to and extending between the forward ends of said lower horizontal links; an upper step tread attached to and extending between the forward ends of said upper horizontal links; resilient spring means connected between one of said horizontal links and one of the non-horizontal links to urge said linkages away from extended position; a vertical arm extending downwardly from each of said supporting brackets immediately forward of said rear link, whereby said rear links bear against said vertical arms as stops when said linkages are moved to extended position; a transverse member connected to and extending between said vertical arms; a transverse rod attached to and extending between said rear links, located to be adjacent to and substantially horizontally aligned with said transverse member when said linkages are extended; U-shaped resilient clips mounted on said transverse member to receive and securely hold said transverse rod when said linkages are in extended position; a slidably mounted latch bar mounted on the under surface of said lower step tread, located to have its rear end rest upon the upper surface of said transverse member when said linkages are in retracted position; and other resilient means urging said latch bar rearwardly to overlie said transverse member, but movable forwardly against the urging of said resilient means to disengage from said member whereby said linkages are freed for movement to extended position.

6. A retractable step which includes: a pair of extensible linkages; supporting means pivotally attached to said linkages to hold the latter in spaced parallel relationship, whereby a framework capable of extension and retraction is formed; a pair of step treads each extending between said linkages and attached thereto for movement therewith; resilient means cooperating with a portion of said supporting means and said framework, attached to one and positioned to engage the other when said framework is in extended position to retain the latter in that position; additional resilient means operatively connected to relatively movable portions of said framework and urging said framework toward its retracted position when in its extended position; and manually releasable latch means between said framework and said supporting means operable to retain said framework in retracted position.

7. A retractable step which includes: a pair of pivoted linkages each of the lazy tongs type; supporting means pivotally attached to each of said linkages to hold the latter in spaced parallel relationship, whereby a framework capable of extension and retraction is formed; a pair of step treads each extending between said linkages and attached thereto for movement therewith; a transverse member extending between said supporting means and rigid therewith; a second transverse member extending between said linkages and movable therewith; engaging means adapted to engage said transverse members and hold them against movement with respect to each other when said framework is in extended position; resilient means operatively connected to relatively movable portions of said framework and urging said framework toward its retracted position, against normal gravitational force, when said framework is in its extended position; and releasable latching means operatively associated with said first transverse member and said framework to prevent relative motion therebetween when said linkages are in retracted position.

WOODFORD J. CRUMP.

REFERENCES CITED

The following references are of record in the file of this patent:

UNITED STATES PATENTS

| Number | Name | Date |
| --- | --- | --- |
| 600,281 | Garland | Mar. 8, 1898 |
| 678,322 | Tefft | July 9, 1901 |
| 1,184,383 | Roebuck | May 23, 1916 |
| 1,218,828 | Barber et al. | Mar. 13, 1917 |
| 1,228,271 | Wells | May 29, 1917 |
| 2,279,594 | Patterson | Apr. 14, 1942 |
| 2,487,921 | Culver | Nov. 15, 1949 |